UNITED STATES PATENT OFFICE.

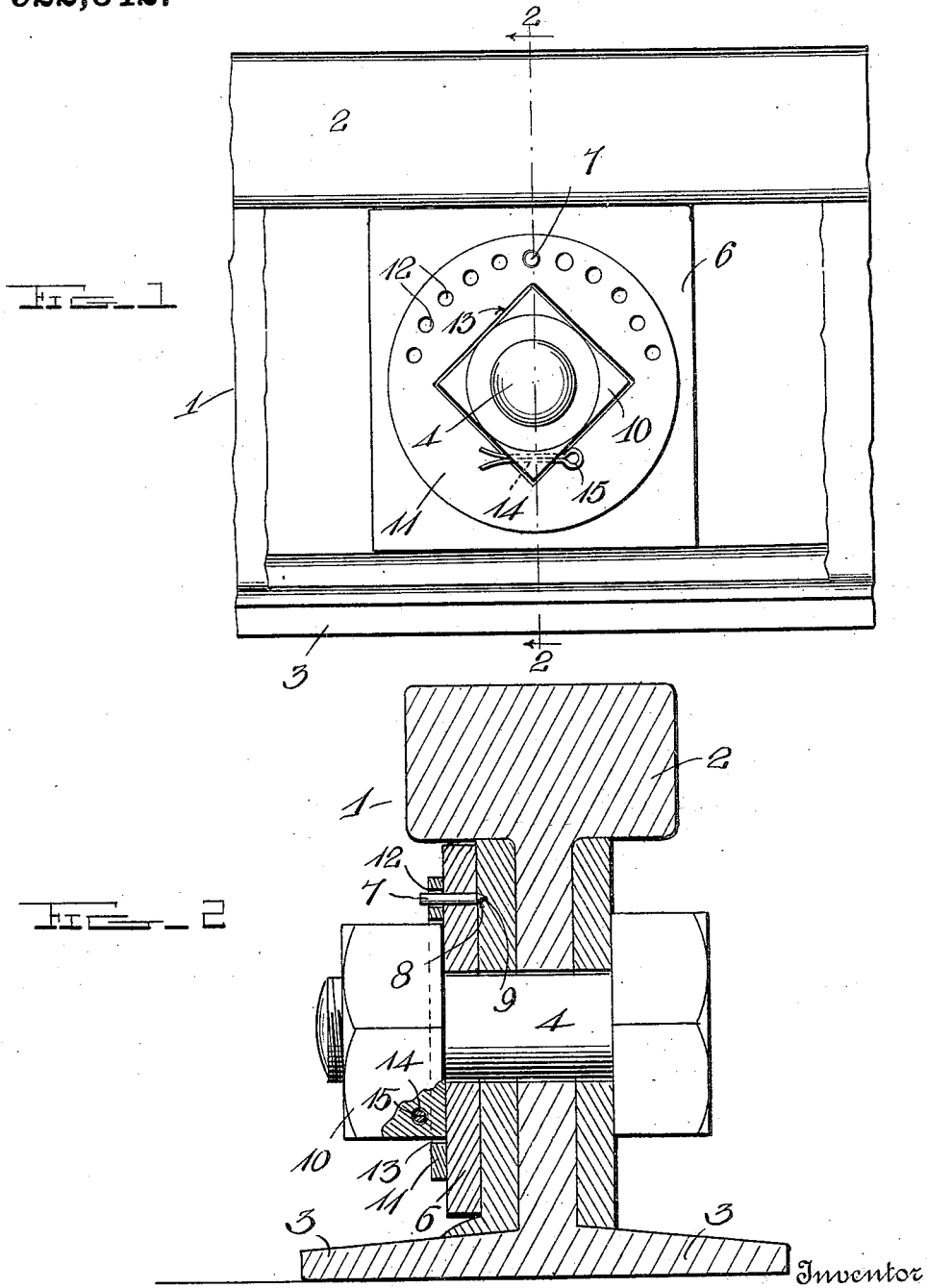

LEO T. TWYMAN, OF GULFPORT, MISSISSIPPI.

NUT-LOCK.

No. 922,642.  Specification of Letters Patent.  Patented May 25, 1909.

Application filed July 23, 1908. Serial No. 444,965.

*To all whom it may concern:*

Be it known that I, LEO T. TWYMAN, a citizen of the United States, residing at Gulfport, in the county of Harrison and State of Mississippi, have invented certain new and useful Improvements in Nut-Locks; and I do declare the following to be a full, clear, and exact description of the invention, such as will enable others skilled in the art to which it appertains to make and use the same.

My invention relates to devices for preventing the turning of bolt nuts and particularly to that class of device known as base washer nut locks.

The object of the invention is to provide a device of this character which may be cheaply and easily manufactured and applied and which will be efficient and thorough in operation so as to at all times prevent the loosening of the nut upon the bolt.

With the foregoing and other objects in view, the invention consists of certain novel features of construction, combination and arrangement of parts, as will be more fully described and particularly pointed out in the appended claims.

In the drawings, Figure 1 is a side elevation of the device applied to the locking bolt of a railroad fish plate; Fig. 2 is a vertical section on the line 2—2 of Fig. 1.

Referring more especially to the drawings, 1 represents the rail which is provided with the usual head 2 and flange 3 and clamped thereto in the usual manner by bolts 4 is the fish plate 5. Surrounding the bolt and abutting the fish plate is a suitable washer 6 which has passing therethrough and projecting on either side a pin 7. In this instance where the lock nut is to be applied to a fish plate, the fish plate or other iron surface is preferably indented with a central punch or the like to form a receiving seat or socket 8 for the pointed end 9 of the pin. The nut 10 of the bolt is threaded thereon and seats against the washer 6 and is locked in adjusted position by a locking plate 11 which is provided with a plurality of peripherally spaced holes 12 adapted to engage the pin. The locking plate 11 has a squared aperture 13 which fits the nut and when one of the apertures 12 is engaged with the pin 7, the locking plate is prevented from turning.

In order to effectually lock the plate 11 from vertical movement upon the nut, I either form the pin 7 of a malleable metal so that after passing through the locking plate 11, it may be bent over thereupon to lock the same or I run through the nut diagonally of one of its corners an aperture or channelway 14 which is adapted to receive a suitable cotter-pin 15. Either method may be employed and in practice when securing fish plates upon rail joints I find that the malleable pin 7 is more readily applied and renders the device less expensive. With the rolling stock, however, and with structures like automobiles where constant vibration is affecting the condition of clamping bolts, I preferably use the cotter-pin construction.

It will be noticed that the washer 6 rests upon the foot or bit in the fish-plate and against the under side of the head of the rail so that it is prevented from turning in any direction. With this construction the socket formed for the reception of the pin may be dispensed with and the pin may simply be a headed nail or the like, which is secured in the opening of the washer and through one of the openings in the locking plate. It will also be noticed that the washer may be dispensed with entirely when working on wood surfaces, and a nail or other device driven through one of the holes in the locking plate.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. In combination with a support, a bolt passing therethrough, a washer carried by said bolt, means carried by the washer for engaging the support to prevent its turning thereon, a nut threaded on said bolt, means surrounding said nut adapted to be engaged by said support engaging means for preventing its turning and means to prevent disengagement of said last named means.

2. In combination with a support, a bolt passing therethrough, a washer surrounding said bolt, means carried by the washer for engaging said support to prevent its turning upon the bolt, a nut threaded upon said bolt, a plate surrounding said nut and having a plurality of apertures adapted to be engaged by said support engaging means and means to prevent disengagement of the plate.

3. In combination with a support, a bolt passing therethrough, a washer surrounding said bolt, a pin passing through said washer to engage said support to prevent its turning upon the bolt, a locking nut threaded upon the bolt and seated against said washer, a locking plate having a plurality of apertures adapted to be engaged by the support engaging pin, and means passing through the nut for holding the locking plate upon the washer.

In testimony whereof I have hereunto set my hand in presence of two subscribing witnesses.

LEO T. TWYMAN.

Witnesses:
　AUDLEY P. SIDES,
　JOHN B. TWYMAN.